(12) United States Patent
Potts

(10) Patent No.: US 9,074,576 B1
(45) Date of Patent: Jul. 7, 2015

(54) CONTROLLED CAPTURE OF THE FULL OCEAN WAVE CYCLE OF ENERGY THAT IS AVAILABLE, HORSE SHOE LIKE SHAPE, (THREE VECTORS) AND THE CONVERSION OF THAT ENERGY INTO ELECTRICAL ENERGY USING A TURBINE/GENERATOR

(71) Applicant: Jon Selby Potts, Estacada, OR (US)

(72) Inventor: Jon Selby Potts, Estacada, OR (US)

( * ) Notice: Subject to any disclaimer, the term of this patent is extended or adjusted under 35 U.S.C. 154(b) by 0 days.

(21) Appl. No.: 14/167,156

(22) Filed: Jan. 29, 2014

Related U.S. Application Data

(60) Provisional application No. 61/963,752, filed on Dec. 13, 2013.

(51) Int. Cl.
  *F03B 13/10* (2006.01)
  *F03B 13/12* (2006.01)
  *H02P 9/04* (2006.01)
  *F03B 13/14* (2006.01)

(52) U.S. Cl.
  CPC ............... *F03B 13/14* (2013.01); *F03B 13/10* (2013.01)

(58) Field of Classification Search
  CPC ................................ F03B 13/14; F03B 13/10
  USPC .......................... 290/42, 53, 43, 54
  See application file for complete search history.

(56) References Cited

U.S. PATENT DOCUMENTS

| | | | |
|---|---|---|---|
| 3,391,903 A * | 7/1968 | Peterson, Jr. ............... | 415/182.1 |
| 3,965,679 A | 6/1976 | Paradise | |
| 4,078,871 A | 3/1978 | Perkins, Jr. | |
| 4,389,843 A * | 6/1983 | Lamberti ....................... | 60/507 |
| 4,914,915 A * | 4/1990 | Linderfelt ...................... | 60/502 |
| 6,551,053 B1 * | 4/2003 | Schuetz ......................... | 415/3.1 |
| 6,849,963 B2 * | 2/2005 | Grinsted et al. .............. | 290/42 |
| 7,448,210 B1 * | 11/2008 | Andalia ......................... | 60/498 |
| 7,479,708 B1 | 1/2009 | Stemiske | |
| 8,049,354 B2 | 11/2011 | Sterniske | |
| 8,093,736 B2 * | 1/2012 | Raftery ......................... | 290/42 |
| 8,143,736 B2 | 3/2012 | Farb | |
| 8,715,496 B2 * | 5/2014 | Bowers et al. ........... | 210/170.11 |
| 2010/0276933 A1 | 11/2010 | Costas | |

* cited by examiner

*Primary Examiner* — Javaid Nasri

(57) ABSTRACT

This invention consists of special structures, methods and devices, which make up a system to provide controlled capture of the full ocean wave cycle, at or near the ocean shore, which includes, surface and some sub-surface energy, the backwash and the undertow. And, it does it in a dynamic and somewhat continuous flow (with the exception of some small storage). The system adjusts for low wave and high wave activity, and also for variations in the tide. The main structure has a barrier wall inside, which can also adjust for variations in the tide, the amount of energy to be collected at high wave activity and in the period/frequency of the waves. The structure includes a small reservoir to help capture more water during low wave activity. The captured water flow is transported to a suitable turbine/generating device for producing electrical energy. A method and some devices are available for controlling the influx of water into the turbine. Thus the ocean wave energy is captured in a better, more effective and efficient manner, producing a controlled environment, thus making the flow of water more suitable output for the conversion of the mechanical energy into electrical energy.

13 Claims, 8 Drawing Sheets

CONTROLLED CAPTURE OF THE FULL OCEAN WAVE CYCLE OF ENERGY THAT IS AVAILABLE, HORSE SHOE LIKE SHAPE, (THREE VECTORS) AND THE CONVERSION OF THAT ENERGY INTO ELECTRICAL ENERGY USING A TURBINE/GENERATOR

CROSS-REFERENCE TO RELATED APPLICATIONS

Provisional application No. 61/963,752; filing date Dec. 13, 2013.

OTHER REFERENCES

1. Vosough A, International Journal of Multidisciplinary Sciences and Engineering, Vol. 2, No. 7, Oct. 2011, p. 60.
2. Cutnell, J D and Johnson K W, Physics, $4^{th}$ Edit., John Whiley & Sons, Inc., 1998, p. 333.
3. Ibid, p. 325.

BACKGROUND OF INVENTION

1. Field of Invention

This invention expands and improves upon ocean wave energy conversion (WEC) installed at or near the ocean shore, by controlling the capture of the full cycle of energy that is available as surface and sub-surface waves, backwash and undertow, along with controlling for tide, period and wave height. And, the energy captured is converted into electrical energy, 2. Prior Related Art Paradise, in U.S. Pat. No. 3,965,679 uses an open trough (inclined ramp) to "increase the thrust of an incoming volume of wave energy"; however it doesn't appear very effective in capturing wave energy nor increasing the efflux speed.

Sternitzke, in U.S. Pat. No. 7,479,708 uses "an inclined ramp with several openings for receiving wave water into several independent chambers for capturing and retaining surge water in hydraulic isolation". Apparently all kinetic energy is converted to potential energy.

Sternitzke adds in U.S. Pat. No. 8,049,354, a claim for "[a] wave power converter employing a flow-controlled duct" and an alternative embodiment called a "wedge". See FIGS. 8-11. The "wedge" has a single chamber and instead of having a single gate valve for each chamber, it has "a plurality of (float) check valve flaps" mounted on the bottom of a ramp and with one chamber.

In U.S. Pat. No. 8,143,736, Farb captures "wave energy in both [the] horizontal and vertical directions" using what he calls "paddle wheels". It apparently takes one paddle wheel for each direction. He illustrates the capture of undertow in FIG. 45; however he doesn't go into any discussion or make any claims. It isn't clear how effectively or efficiently the capture is. FIG. 45 indicates a crash of the wave, which would create turbulence and a loss of some of the energy. There are no illustrations, discussion or claims for capturing backwash.

BRIEF SUMMARY OF THE INVENTION

This Hydro System has four specific structures. They are: a main structure, a return water conduit, a trough under the return water conduit and a small reservoir. The main structure has in the front of the structure, a vertical sliding door, with a special opening, which controls the capture of the ocean waves at various heights. On the inside, top portion, of the main structure, about in the middle, there is a barrier wall, which controls the wave capture at high wave activity and can also control the amount of capture varying with the period of the waves. The main structure has vertical moving doors in the back of the structure, which control the input to the reservoir at low wave activity and can control the output from the reservoir for all wave activity. The reservoir captures and circulates the ocean flow, dynamically, mostly at low wave activity. The return water conduit collects the water from the bottom of the reservoir and also from the bottom of the main structure. The return water conduit bends seaward, at an angle, rounding and decreasing in size as it travels toward the turbine/generator and the output to the sea. A trough, underneath the conduit, collects the un-captured backwash, falling around the Hydro System. That backwash becomes undertow in the trough and assists in the output flow from the return water conduit, especially during incoming tides or currents.

Advantages of this Invention

The advantages of this invention can be found in the stated objectives and methods of control that are listed below:
Four Main Objectives
1. To meet more reasonable electrical generation requirements, by better controlled/capture of the ocean wave cycle of energy at or near the ocean shore.
2. To better control and capture the energy from the full wave cycle of the ocean, including surface and some sub-surface waves, the backwash and the undertow, while also adjusting for variations in the tide and period.
3. To better control and capture the available energy, in a dynamic, somewhat automatic, and continuous flow.
4. To require only one turbine/generator device per unit or structure.
Eight Sub-Objectives
1. To better control and capture some of the wave height variations, with a special opening (triangular shape for illustration) in the frontal door, facing, preferably, the direction of predominate waves of the sea.
2. To better control and capture some of the higher wave height variations, along with their period/frequency and tide variations, using a barrier wall inside the main structure and which has three directions of movement.
3. To better control the capture of flow (wave activity), by having a small reservoir and regulating the amount of water going in and out of it
4. To compensate, to some extent for low wave activity, by collecting and capturing more water at low wave activity than at high, in the small reservoir.
5. To compensate to some extent for low wave activity, by having the reservoir door(s), lower than the tide level, thus letting the water flow downhill into the reservoir
6. To compensate to some extent for low wave activity, by having the bottom of the reservoir slopped downward, toward the sea.
7. To compensate to some extent, when not having high wave activity, by using stored water and letting the extra water flow out of the bottom of the reservoir, in combination with the energy captured directly from the main structure shaft.
Methods of Capture and Control:
There are three distinct methods of capture and control.
1. A vertical moving frontal opening in the general shape of a triangle.
2. A moveable, interior barrier wall, facing the front opening in the main structure, which can further adjust the amount of water captured, and also adjust for the tide and period variations.

3

3. A reservoir that helps compensate for low wave activity, by collecting more water at low wave activity than at high wave activity.

Summary of Brief Description

The controlled wave energy capture (WEC) system can utilize the full potential of the wave cycle (horseshoe shape like) (at or near the shore), which includes surface and subsurface energy, the backwash and the undertow. The small reservoir at the rear of the structure is used primarily to help collect the same amount of energy at low wave activity, as that which is collected at high wave activity, considering both kinetic and potential energy.

DETAILED DESCRIPTION OF THE INVENTION

Figure 1:
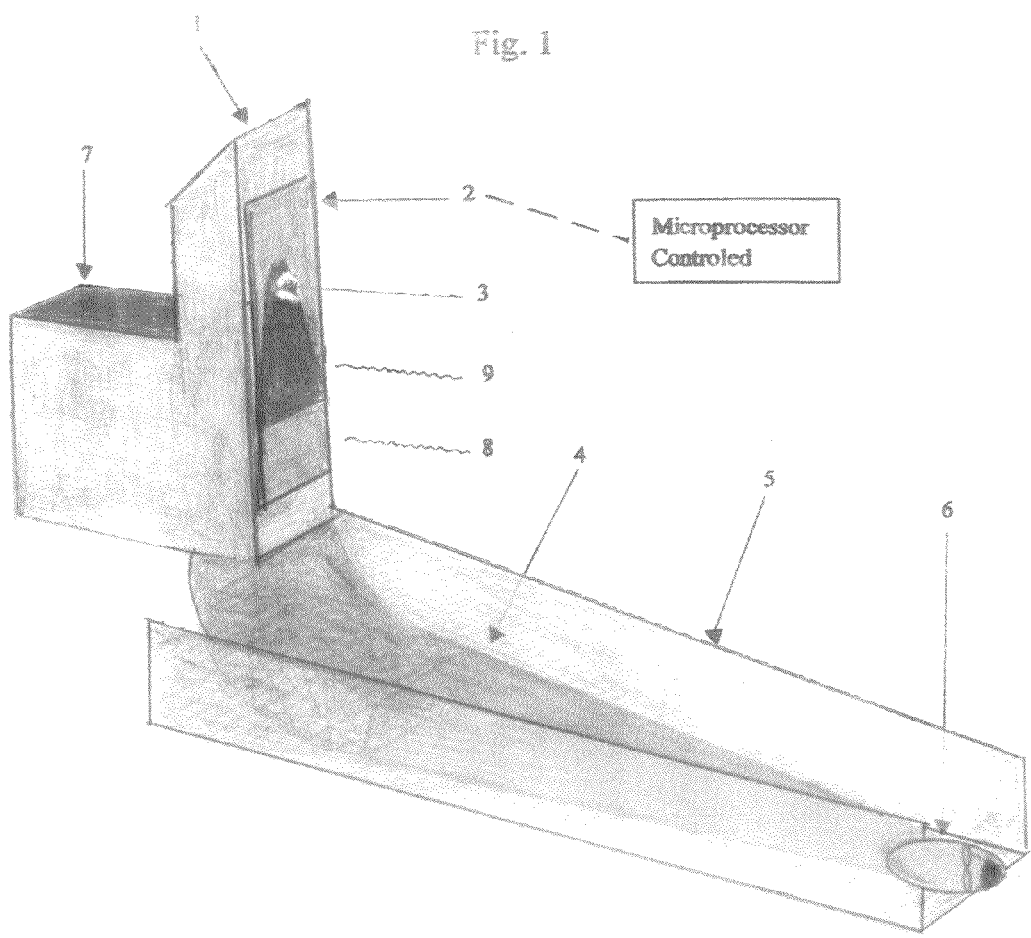
FIG. 1 is a perspective view of the Hydro System for controlled capturing of the full wave cycle of ocean energy, with the conversion of that energy into electrical energy using a turbine/generator.

FIG. 1, the Hydro System, as seen, consists of a main structure 1 having a vertical, elevator shaft like appearance, with a vertical sliding frontal door 2 and a special triangular opening in that door 3. Attached to the bottom of the main structure is a return water conduit 4, which runs downward at first and then bends at an angle seaward. The conduit starts out in a rectangular shape, but rounds and becomes smaller as it extends toward the output to the sea. The conduit concentrates and accelerates the water as it travels seaward and to the turbine/generator 8. The return water conduit 4 can run at any suitable angle for the area of installation, but for illustration, we have used about 45 degrees. The angle of flow should follow the angle of the surrounding bottom of the shore, in the particular area of installation, so that the surrounding undertow can assist in the system's output flow. Underneath the water conduit is an open trough 5, which also narrows as it travels seaward. It collects the un-captured backwash that falls around the outside of the Hydro System and it becomes the undertow as the water returns to the sea. It also concentrates and accelerates the water as it travels seaward and improves the output of the water conduit, especially during incoming tides and currents. The hydro turbine and electrical generating device 6 is located near the sea end of the return water conduit 4. A low to medium head turbine/generator would probably be best. A small reservoir 7 is located behind the main structure and runs toward the shore. The reservoir collects and cycles the water (as backwash and undertow) for the low wave activity that enters the reservoir.

Figure 2:
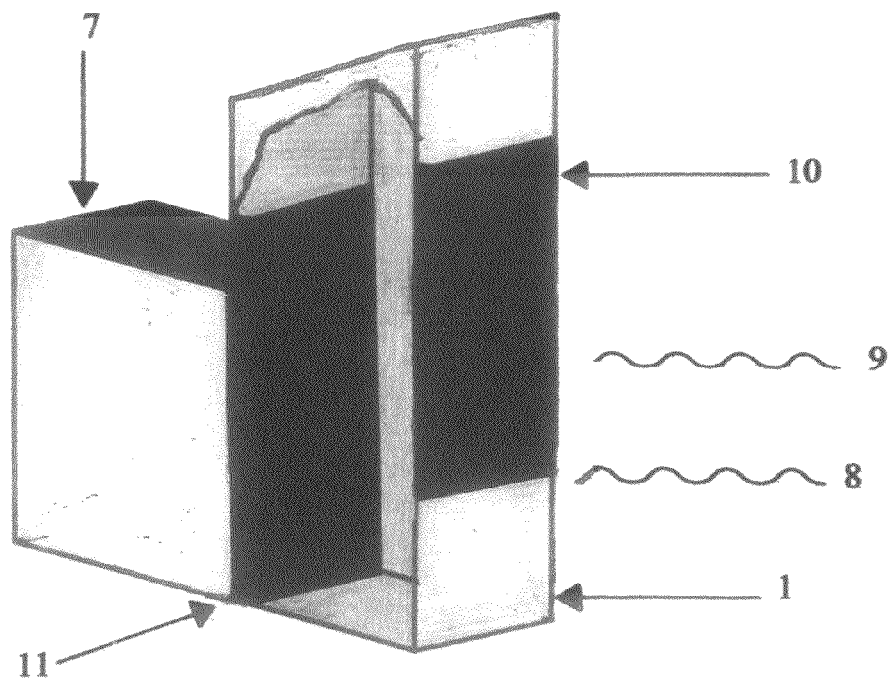
FIG. 2 is a perspective view, with an expanded view and a cutaway into the main structure, showing the two openings in the main structure.

FIG. 2 is an expanded view (for illustration) of the main structure 1, showing two openings, one in the front 10, facing, preferably, the prevailing waves and the other opening in the back 11, opening into the small reservoir 7. The front opening allows for wave capture at both low and high tide levels. The rear opening also allows for low wave activity to flow in and out at various tide levels.

Figure 3:
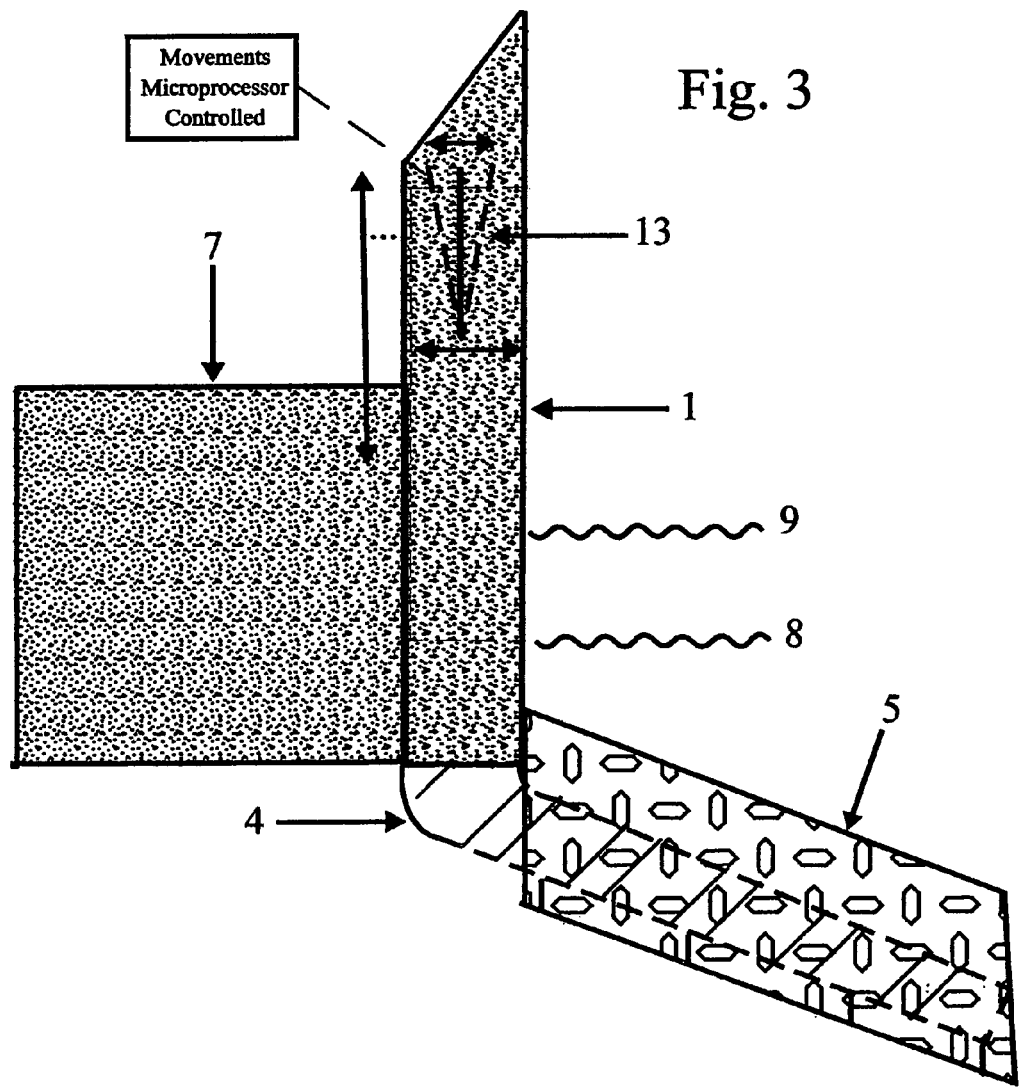
FIG. 3 is a side view of the Hydro System and a see through into the main structure, showing the barrier wall and its movements.

FIG. 3 depicts seeing into the main structure 1 and illustrates the movement capabilities of the barrier wall 13 (straight or "S" curved). The barrier wall is used for controlled capturing during high wave activity. It can move horizontally (distance into the structure from the front), adjusting the amount of water captured in that direction and can adjust for the period/frequency of the waves at a particular time. It can move vertically to adjust for the variations in tide and it can tilt (or pivot, forward or back) to further fine tune the controlled capture of the frontal door opening 3.

Figure 4:
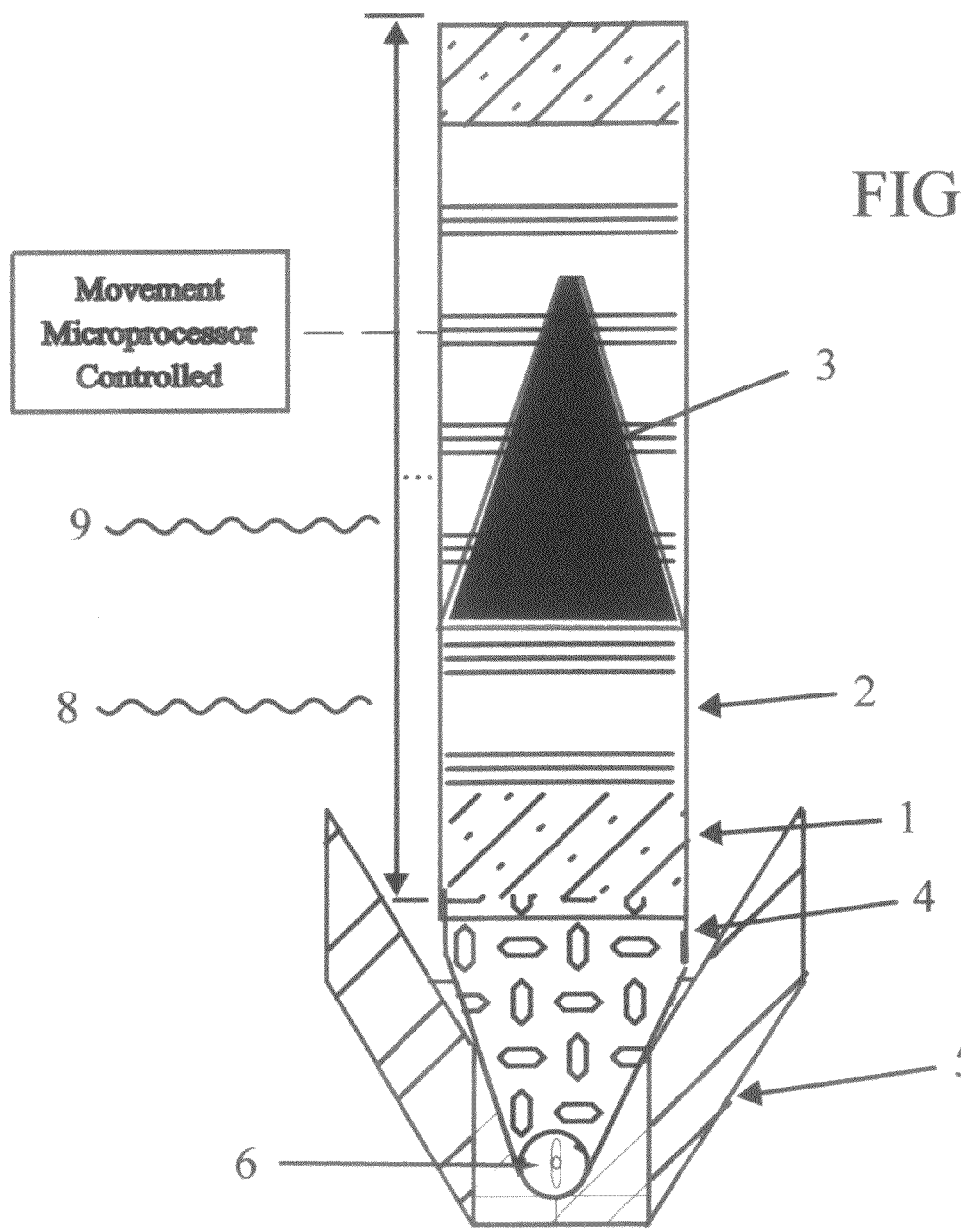
FIG. 4 is the front view of the Hydro System, illustrating the shape and movement of the frontal door and it's triangular like opening (for illustration).

FIG. 4 The main structure's 1 dimensions (front view), the length (parallel or somewhat parallel with the shoreline) requires it to be long enough and the height, tall enough, to capture a reasonable and equal amount of energy as capable (to provide control), as would be required by or desired for the region and area of its location of installation; and at the same time the dimensions, which are set, need to consider the capabilities of the turbine/generator 6. The frontal door 2 covers about 80% of the front of the main structure and slides up and down to adjust for the tide. The opening 3 in the frontal door is shown as triangle, which is a simplification of the shape and is used for illustration. The opening that is shown varies somewhat from what the actual calculations would indicate the shape should be, as taken from Tables I-IV. And, it is sized to adjust the amount of water taken in at any particular wave height. The opening 3 is parallel or nearly parallel with the coastline and facing, somewhat in the direction of prevailing waves. And, it is shaped, such as to collects less water (energy) as the waves get higher, thus trying to equalize the total amount of energy collected at anyone time. The principal is to try to capture an equivalent amount of volume and weight of water and thus same amount of kinetic and potential energy at almost any height of wave. Thus, this invention provides a more controlled and more consistent flow of ocean wave water and energy, going out to the turbine/generator 6. The opening 3 should be covered with a screen (not shown) to prevent any debris from entering the system.

Figure 5:
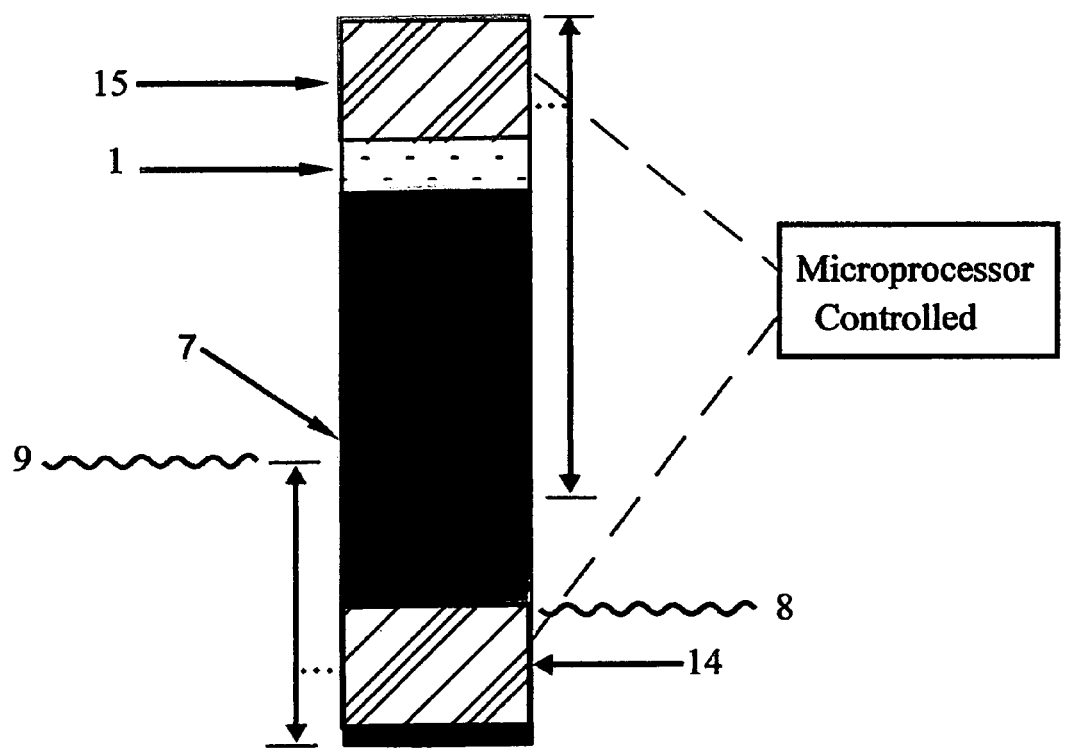
FIG. 5 is a cross-section of the front view of the main structure, revealing the inside, back part and the two vertical sliding doors.

FIG. 5 illustrates two vertical, sliding doors that are mounted inside and in the back of the main structure 1. The first door 14 (the primary door), can leave a small opening at the bottom, which allows for the secondary backwash and undertow, to exit from the reservoir 7. This door allows for controlled output from the bottom of the reservoir 7 to run into the shaft of the main structure 1 and then into the return water conduit 4. The first door also controls the wave activity going into the reservoir at low tide. The second door 15 is used together, in combination, with the first door 14 (as needed) to adjust for the tide variation and amount of water to be collected. Or, the first door and second door can be used in combination to build up short term water storage, by varying the height of the water in the reservoir 7. A third door (not illustrated) could be used, if desired, to increase the height of water collected by a small amount more.

Figure 6:
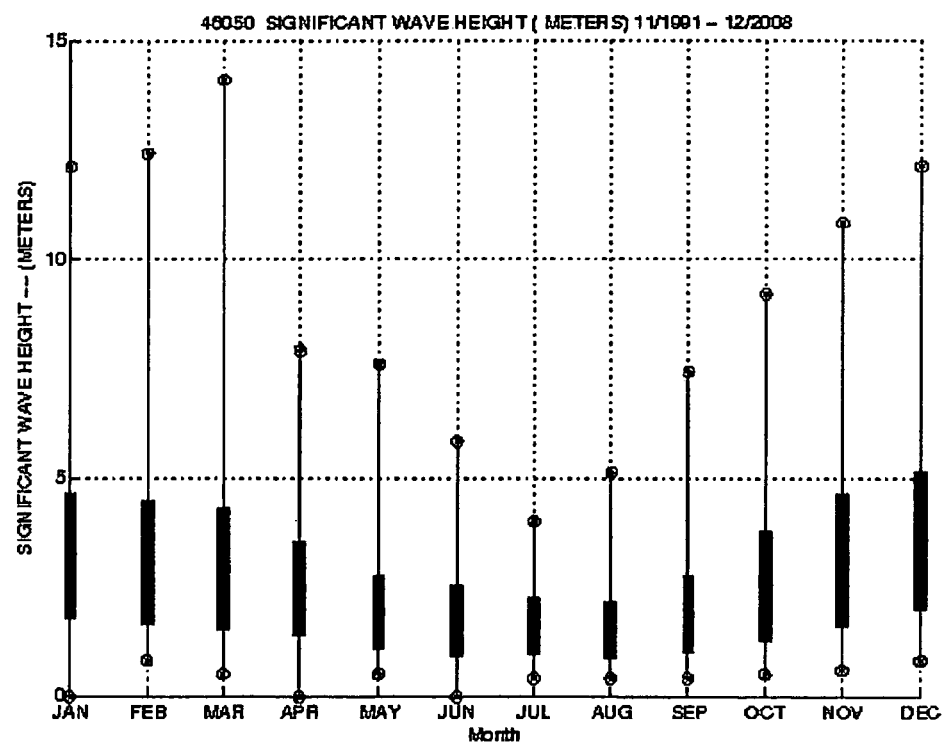
FIG. 6 is a side view of the return water conduit, near the exit, and being able to see into it, revealing the turbine/generator and some of its parts.

FIG. 6 The interior of return water conduit 2, near the exit, depicts the turbine/generator, FIG. 1, 6 and FIG. 4, 6 with some of its parts. The turbine 1 has three blades, which is typical of a low head turbine, which would be required here. The blades can be fixed or variable pitched. The propeller hub 4 helps gradually direct the flow of water 5 to the blades of the turbine. The generator 3 can be DC with an inverter; or AC or AC/DC with frequencies of 50 or 60 cycles and voltages suitable for either foreign or domestic use. Between the turbine and the generator, could be a gear box (not shown). If the generator 3 is of the torque motor type, a gear box is not usually required.

Figure 7:
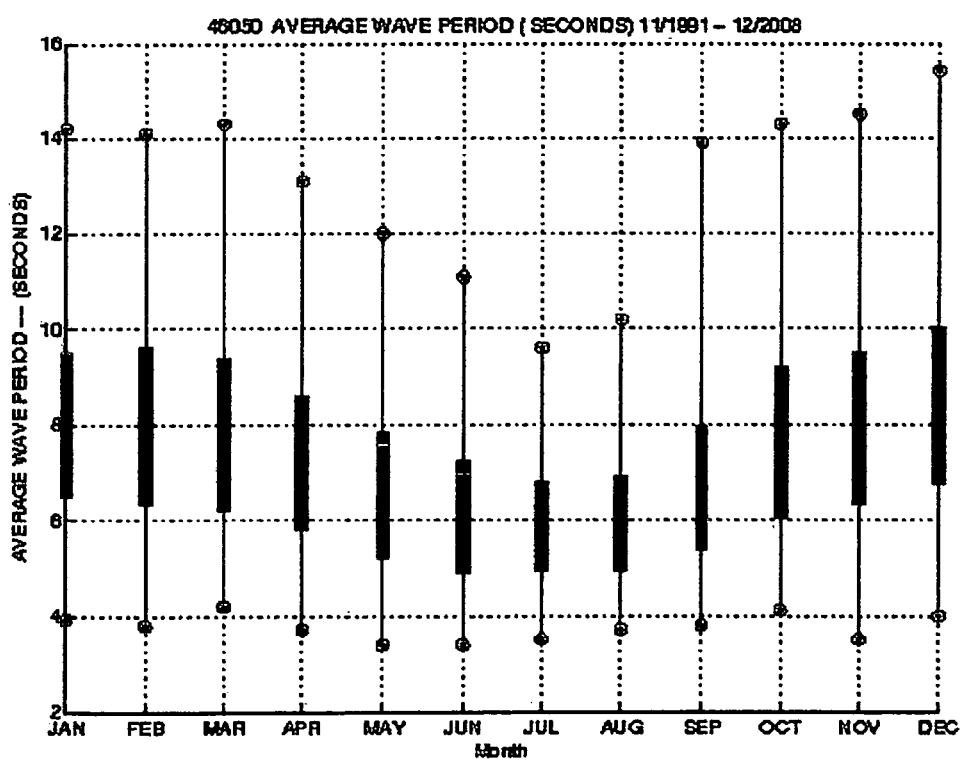
FIG. 7 is a plot of the Significant wave Height (WVHT), in meters, from November 1991-Dec. 1, 2008, from off the coast of Oregon (NDBC-Station 46050).

FIG. 7 is a plot of the Significant Wave Height (WVHT), in meters, from November 1991-December 2008. Significant wave height (meters) is calculated as the average of the highest one-third of all the wave heights during the 20 minute sampling period.

Figure 8:
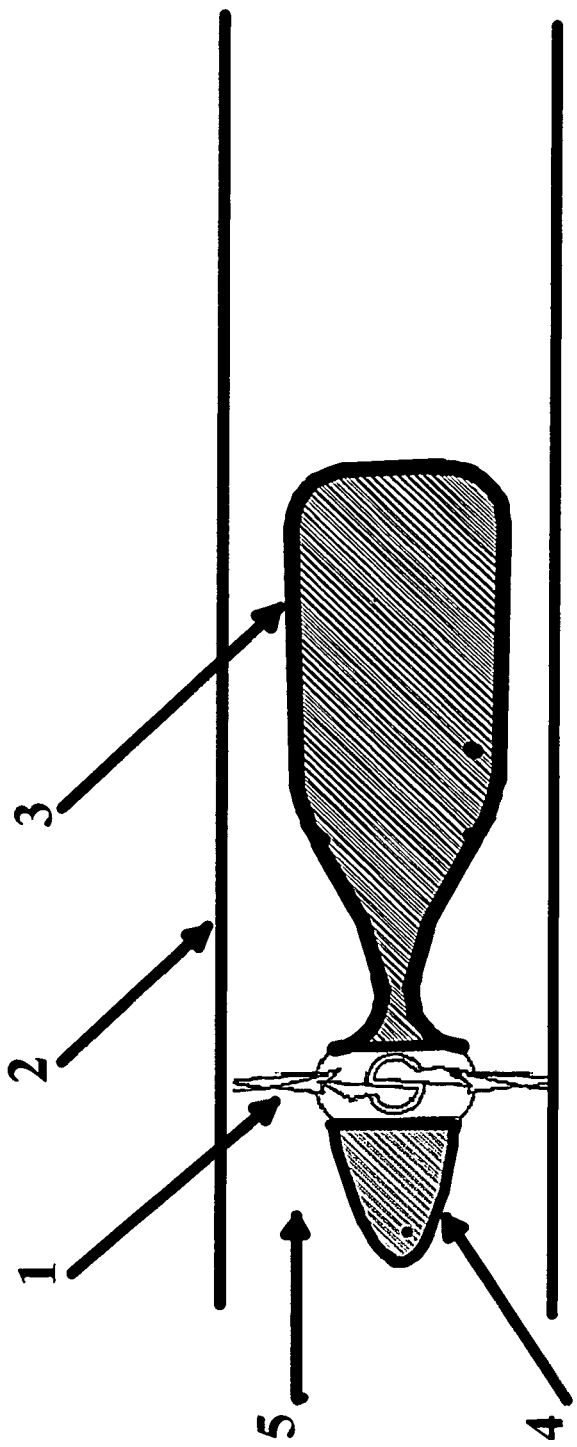
FIG. 8 is a side view of the turbine/generator and some of its functional parts.

FIG. 8 Depicts the turbine/generator with some of its parts. The turbine 1 has three blades, which is typical of a low head turbine, which would be required here. The blades can be fixed or variable pitched. The propeller hub 4 helps gradually direct the flow of water (energy) 5 to the blades of the turbine. The generator 3 can be DC with an inverter; AC or AC/DC, and can have frequencies of 50 or 60 cycles and voltages, which are suitable for either foreign or domestic use. Between the turbine and the generator, could be a gear box (not shown). If the generator 3 is of the torque motor type, a gear box is not usually required.

FIG. 8 is a plot of Average Wave Period (APD), seconds The Average wave period is all waves during the 20 minutes of the sampling period. Note: All samplings occurred every hour.

Summary of Detailed Description and Figures

The actual dimensions for the Hydro System FIG. 1 and its devices, depends on the area of installation and the efflux speed capability of the turbine/generator 6. That is the dimensions of the system need to be fairly well designed and built to closely and consistently control the capturing of both low wave activity and high wave activity (wave crests and troughs); and have the ability of those capturing devices (doors and barrier wall) to move up and down with the tide in that area. The dimensions used for the bather wall, FIG. 3, 13, also allows for a reasonable average range of period/frequencies to be captured. All of this needs to be done within the range of the efflux speed capabilities of the turbine/generator 6. Or, if desired or deemed necessary, the efflux speed can be controlled near the output (see discussion later).

The dimensions of the Hydro System FIG. 1 also depend on the amount of the prevailing "significant wave heights" that one wants to capture and the economics that are involved in capturing them. There are ways of modifying the wave activity coming into the Hydro System, which could produce lower wave crests and shallower wave troughs, which would allow for a shorter height in the main structure 1 and still function properly. Ideally, one would like to increase the heights of low waves and decrease the heights of high waves in order to capture more energy and provide better control. As indicated by others, it is preferable not to have the wave crest break, as that creates a loss in energy due to turbulence. However, these methods and devices are not discussed further or illustrated herein.

Thus this invention better controls the capture of the full wave cycle of the energy at various wave heights, tide levels and periods/frequencies. It can also control the efflux speed. And, the system does this in essentially a dynamic, and to some extent, continuous manner (with the exception of when it might be storing water in the reservoir 7).

Data Used for Design

For the purpose of this illustration of the design, we have taken ocean statistics for the Pacific Coast (Oregon, NBC-Station 46050). Oregon is one of five major areas that is best suited for capturing ocean energy. The dimension for the devices for the Hydro System FIG. 1, the two openings in the main structure FIG. 2, the opening in the frontal door FIG. 1, 3 and barrier wall FIG. 3, 13 and the doors in the back of the main structure FIGS. 5, 10 & 11 are all designed around and used as an example and are based on the weather data collected by the National Data Buoy Center (NDBC), at Station 46050 (LLNR 641) -Stonewall Bank-20NM West of Newport, Oreg.

The following plotted data was used

The frontal door opening FIG. 1, 3 and FIG. 4, 3, which is shown in a triangular shape (except for being flat at the top), allows approximately same amount of energy to be captured from about 0.33 meters high to 8 meters high. At around 2 to 2.5 meters of wave height and under, it is necessary for some or most of the waves to pass over into the small reservoir FIG. 2, 7, in order to capture the same amount of energy and thus providing better control at low wave activity. The width of the main shaft FIG. 3, the distance in horizontally towards the shore, is determined on the basis of the control needed, using the barrier wall 13 and can be set at between 1 to 3 meters or some other reasonable distance to adjust for the period/frequency of the prevailing waves and the amount of water to be taken in for the theoretical amount power to be generated. For finer tuning of the frontal door opening FIG. 4, 3, the barrier wall FIG. 3, 13, can also be tilted (pivot) in or out, towards or away from the ocean, to also help adjust the amount of energy captured at high wave activity. Most of the wave heights FIG. 7 were less than 10 meters high. The average wave heights were from about 0.5 meters high to about 5 meters, providing an approximate average of the average of around 3 meters high.

Note: The wave heights were arbitrarily chosen to capture over 50% of the highest of the Significant Wave Height's (WVHT). The average wave period FIG. 8 was from 5 to 9 seconds, providing an average of the average of about 7 seconds. These averages were used to calculate the "wave energy flux" for the illustrated System's electrical energy capability.

Energy Availability

The power calculations for surface waves (crests & troughs), sub-surface waves, backwash and undertow captured by the Hydro System FIG. 1 are presented below: The proposed wave energy flux has been calculated for different wave heights in a couple of scenarios of kW potential. Actual values will be somewhat less, due to losses such as turbulence from striking the barrier wall 13 and the water falling somewhat randomly, initially, down the shaft etc. The barrier wall can be either straight or "S" like curved with the top of the "S" facing the ocean and the bottom tail of the "S" facing the reservoir. The curved baffle would keep more wave crests from breaking at high wave activity and at low wave activity. Thus more kinetic energy will be preserved. Note: This would require minor changes in the frontal opening's FIG. 1, 3 dimensions. Also, waves are generally lower in both height and energy as they come closer to shore. And, in addition, losses of energy can be expected in the energy conversion process.

Calculation of Wave Power Formula[1]

The potential wave energy flux (P) was calculated using the formula for deep water. Note: Deep water is defined as the water depth being larger than half the wavelength. Whether it will be actually deep water, will depend on the terrain, where the system is installed and how it is installed.

$$P = pg^2/64\pi(H^2mo\ T) \approx 0.5\ (kW/m^3 \cdot s) H^2mo\ T$$

Where:

P is the wave energy flux per unit of wave-crest length.

p is the sea water density (1025 Kg/m\ g is the acceleration of gravity (9.80 m/s$^2$).

Hmo is the significant wave height in meters.

T is the wave period in seconds.

In calculating the dimensions of the opening 3 (triangle), in the vertical sliding door FIG. 1, 2, for Table 1, 80 kW and Table II, 160 kW, an average of the average period was used, which was about 7 seconds. The maximum length, of the bottom of the opening 3 was arbitrarily chosen as 5 meters for practical reasons. The width, into the main structure 1 (horizontally, sea to shore), that was used for Table I, was arbitrarily set at 1 meter and for Table II the width was set at 2 meters. Using those dimensions, the values for the other dimensions at various heights were calculated. For waves around 2 to 2.5 meters or less, it becomes necessary to capture more water than the frontal direction of the main structure 1 can capture and therefore water is allowed to spill over or run into the small reservoir 7.

Note: As previously indicated, the triangular shape for the opening 3 that is depicted, is a simplified illustration of what could or would be actually used. The shape simply and suitably demonstrates the principals that apply here. Table III and IV illustrate the ability of the barrier wall 13 of being able to move horizontally, either seaward or towards the shore and being able to adjust for a wide variation in the period/frequency (from 3 to 15 secs) of the ocean waves. A microprocessor, to control this movement, would provide the most efficient and effective use of this device.

TABLE I

Wave Energy Flux @ 80 KW
The barrier wall is set at 1 m and the
period for seven (7) seconds

| KW out | HT m | Length m | Width m |
|---|---|---|---|
| 80 | 8.0 | 0.3571 | 1 |
| 80 | 7.5 | 0.4063 | 1 |
| 80 | 7.0 | 0.4665 | 1 |
| 80 | 6.5 | 0.5410 | 1 |
| 80 | 6.0 | 0.6350 | 1 |
| 80 | 5.5 | 0.7556 | 1 |
| 80 | 5.0 | 0.9143 | 1 |
| 80 | 4.5 | 1.129 | 1 |
| 80 | 4.0 | 1.429 | 1 |
| 80 | 3.5 | 1.866 | 1 |
| 80 | 3.0 | 2.540 | 1 |
| 80 | 2.5 | 3.657 | 1 |
| 80 | 2.0 | 5.0 | 1.143 |
| 80 | 1.5 | 5.0 | 2.032 |
| 80 | 1.0 | 5.0 | 4.571 |
| 80 | 0.5 | 5.0 | 18.29 |
| 80 | 0.333 | 5.0 | 41.23 |

TABLE III

Wave Energy Flux @ 80 KW
The barrier wall is set for a period of
three (3) seconds.

| KW out | HT m | Length m | Width m |
|---|---|---|---|
| 80 | 8.0 | 0.595 | 1.400 |
| 80 | 7.5 | 0.677 | 1.400 |
| 80 | 7.0 | 0.778 | 1.400 |
| 80 | 6.5 | 0.902 | 1.400 |
| 80 | 6.0 | 1.058 | 1.400 |
| 80 | 5.5 | 1.269 | 1.400 |
| 80 | 5.0 | 1.524 | 1.400 |
| 80 | 4.5 | 1.881 | 1.400 |
| 80 | 4.0 | 2.381 | 1.400 |
| 80 | 3.5 | 3.110 | 1.400 |
| 80 | 3.0 | 4.233 | 1.400 |
| 80 | 2.5 | 5.0 | 1.707 |
| 80 | 2.0 | 5.0 | 2.667 |
| 80 | 1.5 | 5.0 | 2.844 |
| 80 | 1.0 | 5.0 | 6.400 |
| 80 | 0.5 | 5.0 | 25.60 |
| 80 | 0.333 | 5.0 | 57.72 |

TABLE II

Wave Energy Flux @ 160 KW
The barrier wall is set at 2 m and the
period for seven (7) seconds.

| KW out | HT m | Length m | Width m |
|---|---|---|---|
| 160 | 8.0 | 0.3571 | 2 |
| 160 | 7.5 | 0.4063 | 2 |
| 160 | 7.0 | 0.4665 | 2 |
| 160 | 6.5 | 0.5410 | 2 |
| 160 | 6.0 | 0.6350 | 2 |
| 160 | 5.5 | 0.7556 | 2 |
| 160 | 5.0 | 0.9143 | 2 |
| 160 | 4.5 | 1.129 | 2 |
| 160 | 4.0 | 1.429 | 2 |
| 160 | 3.5 | 1.866 | 2 |
| 160 | 3.0 | 2.540 | 2 |
| 160 | 2.5 | 3.657 | 2 |
| 160 | 2.0 | 5.0 | 2 |
| 160 | 1.5 | 5.0 | 4.063 |
| 160 | 1.0 | 5.0 | 9.143 |
| 160 | 0.5 | 5.0 | 36.57 |
| 160 | 0.333 | 5.0 | 82.45 |

TABLE IV

Wave Energy Flux @ 80 KW
The barrier wall is set for a period of
fifteen (15) seconds.

| KW out | HT m | Length m | Width m |
|---|---|---|---|
| 80 | 8.0 | 0.3572 | 0.4666 |
| 80 | 7.5 | 0.4064 | 0.4666 |
| 80 | 7.0 | 0.4665 | 0.4666 |
| 80 | 6.5 | 0.5410 | 0.4666 |
| 80 | 6.0 | 0.6350 | 0.4666 |
| 80 | 5.5 | 0.7556 | 0.4666 |
| 80 | 5.0 | 0.9143 | 0.4666 |
| 80 | 4.5 | 1.129 | 0.4666 |
| 80 | 4.0 | 1.429 | 0.4666 |
| 80 | 3.5 | 1.866 | 0.4666 |
| 80 | 3.0 | 2.540 | 0.4666 |
| 80 | 2.5 | 3.657 | 0.4667 |
| 80 | 2.0 | 5.0 | 0.5333 |
| 80 | 1.5 | 5.0 | 0.9481 |

TABLE IV-continued

Wave Energy Flux @ 80 KW
The barrier wall is set for a period of
fifteen (15) seconds.

| KW out | HT m | Length m | Width m |
|---|---|---|---|
| 80 | 1.0 | 5.0 | 2.133 |
| 80 | 0.5 | 5.0 | 8.533 |
| 80 | 0.333 | 5.0 | 19.24 |

Additional Power Available

Additional energy can be made available, when needed and if stored, from the reservoir 7. The water in the reservoir 7 can be considered secondary backwash and undertow. Additional turbulence losses will occur due to mixing of the flow or storage with the flow of the captured wave energy exiting the main structure 1.

Efflux Speed[2]

For the efflux speed, the Bernoulli's equation was used:

$$P_1+1/2pv_1^2+pgy_1=P_2+1/2pv_2^2+pgy_2$$

Where:
P=pressure at any two points (1 and 2)
p=density of fluid (1.025 Kg/m$^3$).
v=fluid speed, before and after.
y=elevation at any two points (1 and 2)

The calculation of the efflux speed of water from the Hydro System FIG. 1 (excluding the concentrating effect of the return water conduit) can be modified and simplified. The simplified version is called Torricelli's equation (this is a particular case of the Bernoulli's principle or equation) and is:

$$P=pg^2/64\Pi(H^2moT=0.5 (Kw/m3 \cdot s)H^2mo$$

The calculation of the efflux speed of water from the hydro system FIG. 1 (excluding the water conduit concentrating effect) can be modified and simplified. The simplified version is called Torricelli's equation (this is a particular case of the Bernoulli's principle or equation) and is:

$$v_1 = \sqrt{2gh}$$

Where:
v1 is the efflux speed from the hydro system (m/s).
g is the acceleration of gravity (9.80 m/s$^2$)
h is the height of water above the outlet in meters.

Note: Even though the reservoir 7 is not a very large tank as a source, we believe that this formula can be used since the liquid level changes for the head, will still be minimal on the average due to continued replenishing.

In our example, the variation in efflux speed of the captured water due to the heights of water in the reservoir and/or the main structure would be from about 14.3 m/s at low tide and low wave activity to 21.0 m/s at high tide and high wave activity.

For the increase in efflux speed due to the shape of the return water conduit 4 and the concentrating effect, the Bernoulli equation could be modified, simplified and used. However, the use of the "Equation of Continuity"[3] is a little more straight forward and it has less assumptions. And thus, that is the equation we use here:

$$p_1A_1v_1=p_2A_2v_2$$

Where:
p is the density of sea water (1025 Kg/m\
A$_1$ is the area of influx (15 m$^2$).
v$_1$ is the speed at influx (m/s).
A$_2$ is the area at efflux (1.5 m$^2$).
v$_2$ is the increase in speed at efflux (m/s).
The simplified efflux equation is:

$$v_2=A_1v_1/A_2$$

Thus in our example, the efflux speed has increased an additional 10 times, due to the return water conduit's 4 concentrating effect.

Control of the Efflux Speed

The influx speed to the turbine/generator FIG. 8, as mentioned earlier, can be controlled by having several small openings and doors around the water conduit, just before the turbine, which could be used to expel excess influx, over what the turbine/generator can handle. The effect would be doubled or almost double, as less water would be running through the turbine propellers and the turbine's presence decreases the flow area around it. The function of the opening of the doors could be controlled with hydraulics and a microprocessor. However, it would be preferred to have a turbine/generator, which has a broader range of capability of speed operation, so that as much of the energy that is available and captured can be used.

Turbine/Generator

A low or medium head hydro turbine/generator FIG. 8 would be preferred. However, a special hydro turbine may need to be manufactured, specifically for this use, and may be more desirable for full effectiveness and efficiency, since the methods and the amounts of potential capture of energy are somewhat unique to this invention.

Doors and Barrier Wall

The vertical sliding doors and the movements of the barrier wall FIG. 3, 13 can be accomplished in several ways, with different methods, devices and mechanisms, including using latching mechanisms. What will be best for this system can be determined later on the basis of efficiency, cost effectiveness and reliability by those more skilled in the arts.

Devices Used for Movement

Motors, mechanisms and devices for the sliding doors and the moving barrier wall FIG. 3, 13 are not identified, shown or specified. Any gears, pulleys, chains, cables, etc. and limit switches (for backup), that can be used are also not identified, shown or specified. These items can be readily determined by those better skilled in those arts, as to what would function best and be the most reliable under ocean atmospheric conditions. The movements of the doors and barrier wall 13 and their functions, could be performed using several types of devices or mechanisms using tracks, guide posts, floats; some mechanical or electro-mechanical devices, etc. The barrier wall 13 could pivot from the bottom, center, or top or anywhere in between and it would still provide the same or similar function. The drive motors for these functions, can be controlled, using a microprocessor. A microprocessor could continually adjust for wave activity, tide level, period and efflux speed.

The Reservoir

As discussed earlier, the primary purpose of the reservoir FIG. 1, 7 is to control and collect the low wave activity. And, that is waves of around 2 to 2.5 meters or less. The storage collected in the reservoir could also be used to mediate the energy required to balance the head differences between the high and low tides and thus, providing better control for the turbine/generator 6. A monitoring device could be used for the output flow (efflux) in conjunction with a microprocessor to help determine the amount of output to release from the reservoir and thus again providing better control. Also, things like keeping the top level of the door to the reservoir lower than the tide level would improve the flow through the reservoir 7. And, a slope downward, towards the sea, of the bottom of the reservoir 7, would also improve the movement out and the mixing of the water flow, at the shaft of the main structure 1 before entering the return water conduit 4.

Installation of the Hydro System

The main structure FIG. 1, 1 (with an elevator shaft like shape) should be tall enough to accommodate both the variations in tide and a reasonable amount of capture of the "significant wave height" in the region and area where installed. The height constructed would also depend on the percentage of the prevailing "significant wave heights" that one wanted to capture and the economics that are involved in capturing that energy. There are ways of modifying the wave activity coming in, which would allow for shorter heights in the main structure FIG. 1,1 (these modifications are not presented or illustrated herein). The structural opening FIG. 2, 10 and the opening in the door FIG. 1, 3 (parallel with the shoreline and at the various heights of waves), should be long enough to capture a reasonable and equal amount of energy as capable at both high and low wave activity for better control. The structure width (the horizontal distance into the shaft), perpendicular or somewhat perpendicular to the coastline, will vary according to the wave activity in area, the equipment generating capabilities and the average frequency/period that is desired to be captured.

Construction Materials for the Main Structure and Reservoir

The reservoir FIG. 1, 7 and main structure 1 can be constructed of reinforced concrete (or any other rigid and durable material), that is not subject to corrosion by seawater, with components cast into the concrete or fitted to these structures.

Materials for the Doors and Barrier Wall

The doors and barrier wall can be made from a light weight, high strength metal alloy, not subject to corrosion; or a reinforced composite, or any other suitable, lightweight and durable material. The material should be something that is not subject to aging and cracking over time, from the severe ocean environment.

Expansion of Hydro Facilities

The actual length (horizontal direction, parallel to shore or prevailing waves) of the main structure FIG. 1,1 could be almost any dimension, with one or more frontal shafts and openings and sliding doors 2 etc. Or, the door 2 could be wider, as long as both the structure and door are properly braced in between. The height of the structure could be considerably shorter, if the top of the door 2 could be suitably segmented and folded in, at the top; as long as it is still functional (details are not presented or illustrated herein). Also, several outputs from capturing devices and systems could be combined together and flow into one conduit system with a larger turbine/generator 6 being used.

Structure Location

The more logical locations for these hydro capturing systems would be along cliffy, deep water areas, which are along remote coastlines of fairly high wave activity. This would be naturally and generally far from most recreational types of activities in the area (except for maybe cliff climbing). These installations should also be away from easily accessible and popular scenic areas. Being on the coastline provides for better accessibility to land power transmission facilities and the area of use. And, in addition, structures near or on the coastline are better protected from the more extreme weather conditions that occur on the open seas.

SUMMARY

This invention contains several new and novel concepts, methods and devices for the controlled capture of ocean wave energy. These have been combined to form a controlled capture Hydro System from which the captured ocean energy is converted into electrical energy. This invention should greatly improve the approach to the collection of and the use of ocean energy in field of wave energy converters (WECs). The description of this invention is only illustrative of the concepts, methods, devices and items that can be used for collecting and controlling the capture of the ocean wave energy. Various changes in details of the illustrated design and its workings, and the proposed construction of such systems can therefore be made, well within the scope of the concepts, methods and principles that are presented and illustrated in this patent. This invention is not limited to these illustrations, methods, devices and items, which have been discussed. And thus, many and various improvements, modifications of design and structural changes can and will probably be made, without departing from the overall concepts and principles of the invention, as can be determined by those that are more experienced and skilled in this art.

The invention claimed is:

1. A system for controlled capture of the full ocean wave cycle of energy (potential and kinetic) of the incoming ocean wave, that is, surface and sub-surface waves, the capture of the energy from the ocean backwash, which is formed from the wave running out of kinetic energy, hitting a stop such as a cliff or as in our case, hitting the inside, back of the main structure and/or the barrier wall (baffle) inside, and the collection of that ocean water (energy) in the main structure shaft or the small reservoir attached at the rear of the main structure, which ocean water then becomes the water (energy) of the undertow, as out flux; with controlled adjustments for the amount of ocean water (energy) captured at various wave heights by changing the shape of intake opening of the main structure, for the ocean wave height variations in potential energy due to normal wave height changes and the normal ocean tide changes by the raising and lowering of the front intake door (vertical sliding frontal door) and for the normal variations in the ocean period (frequency), using the barrier wall (baffle) capabilities of being able to move forward (toward the ocean), backward (toward the shore), or up and down for the ocean tide changes with an undertow trough located under the return water conduit, collecting the surrounding backwash and undertow to assist in the out flux of the system and the influx to the turbine/generator and thus using these devices and methods for the overall control of the velocity of ocean water output (energy) and its effectiveness~ and using a turbine/generator, as the method of conversion of that energy into electrical energy.

2. A system of claim 1, that is dynamic, continuous and effective in the controlled capture of a considerable amount of the ocean wave energy cycle (influx, backwash, and out flux (as undertow)) that is normally available, at or near the ocean shoreline.

3. A system of claim 1 of devices (vertical doors and a barrier wall), that are microprocessor controlled, which are coordinated and optimized to control capture most of the variable conditions of the ocean environment in order to provide the most effective and efficient use of the ocean's energy as possible.

4. The main structure of claim 1, which further comprises having a main structure of elevator shaft-like appearance, with one opening in front facing the ocean's dominate prevailing waves coming in and having another opening in the back of the main structure, which faces the shore and the attached reservoir and allowing in and collecting more water (energy) at low wave height to balance the total amount of energy captured in all, during an ocean's rising and lowering tide cycle.

5. The vertical sliding frontal door of claim 1 which allows for adjustment (up and down), with microprocessor control, for the various heights of the predominate ocean waves and variations in the ocean tide levels that occur throughout the year.

6. The main structure of claim 1, which further comprises a primary, vertical sliding door, coveting the rear, inside opening of the main structure, which allows and controls most of the ocean water flow (energy) in and out of the small reservoir at low ocean wave heights.

7. The main structure of claim 1, which further comprises a secondary vertical, sliding door, also in the rear of the main structure and is directly in front of the primary door (back to back), which works in conjunction with the primary vertical sliding door and helps adjust for the various ocean tide levels, by either blocking the flow of ocean water into the reservoir or by allowing part or all of it in.

8. The moving barrier wall (baffle) of claim 1 as a fiat plate, steel or reinforced plastic, inside the upper part of the main structure, across the full inside width of the structure, in about the middle (seaward/shoreward), which is able to move horizontally (seaward or shoreward) adjusting for the amount of high ocean wave activity to be captured and adjusting for the frequency (period) of the ocean waves, is able to move vertically to adjust for ocean tide level changes and is able to tilt (back and forth) to fine tune the adjustment (amount of water flow (energy) in) of the ocean water coming in the opening of the frontal door.

9. The return water conduit of claim 1, which collects the ocean backwash from the bottom of the main structure and the small reservoir, concentrates it and accelerates it, as it transports the ocean water flowing through the conduit to the turbine/generator.

10. The turbine/generator of claim 1, which comprises a low to medium head turbine with three blades, fixed or variable, and a propeller hub that helps direct the flow of the influx to the turbine; or one designed for use in such a system, which would be the most effective and efficient device for this Hydro System and with a generator, which can be DC with an inverter, AC or AC/DC, with frequencies of 50 or 60 cycles and voltages suitable for either foreign or domestic use.

11. The undertow trough of claim 1, which is under the return water conduit, wherein it captures, collects, concentrates and accelerates the un-captured ocean water falling in and around the outside of main structure, which is also ocean backwash, which becomes as undertow and, assists in the output flow of ocean water (energy) from the conduit and through the turbine/generator.

12. The small reservoir, of claim 1, wherein it is dynamic and captures and cycles most of the ocean water at low wave activity.

13. Devices and a method of claim 9 of small openings and doors in and around the outside of the return water conduit, which are also microprocessor controlled and are located just before the turbine area, which helps further to control the influx speed to the turbine/generator.

\* \* \* \* \*

UNITED STATES PATENT AND TRADEMARK OFFICE
CERTIFICATE OF CORRECTION

PATENT NO. : 9,074,576 B1  
APPLICATION NO. : 14/167156  
DATED : July 7, 2015  
INVENTOR(S) : Potts Page 1 of 1

It is certified that error appears in the above-identified patent and that said Letters Patent is hereby corrected as shown below:

DETAILED DESCRIPTION OF THE INVENTION

Column 5, line 29-32 should read

FIG. 6 is a plot of Average Wave Period (APD), seconds. The Average wave period is all waves during the 20 minutes of the sampling period, Note: All samplings occurred every hour.

Signed and Sealed this

Sixteenth Day of August, 2016

Michelle K. Lee  
*Director of the United States Patent and Trademark Office*